United States Patent [19]

Kennedy

[11] Patent Number: 5,459,220

[45] Date of Patent: Oct. 17, 1995

[54] USE OF BIURET AND TRIMER ISOCYANATES AS CROSSLINKERS IN GOLF BALL COATINGS

[75] Inventor: Thomas J. Kennedy, Chicopee, Mass.

[73] Assignee: Lisco, Inc., Tampa, Fla.

[21] Appl. No.: 93,252

[22] Filed: Jul. 16, 1993

[51] Int. Cl.[6] .................................................. C08G 18/00
[52] U.S. Cl. .................................. 528/44; 528/76; 528/85; 427/393.5; 427/412.1; 273/233; 273/235 A; 273/235 R
[58] Field of Search ................................ 273/233, 235 A, 273/235 R; 427/393.5, 412.1; 528/44, 76, 85

[56] References Cited

U.S. PATENT DOCUMENTS 5,300,325  4/1994  Nealon et al. .......................... 427/379

*Primary Examiner*—James J. Seidleck
*Assistant Examiner*—Duc Truong

[57] ABSTRACT

A golf ball having an improved urethane top coat is disclosed. The top coat is formed from a two-part polyurethane system where the first part contains a hydroxyl functional polyol and the second part contains a diisocyanate crosslinking agent selected from the group consisting of biurets of hexamethylene diisocyanate and isocyanurate trimers of hexamethylene diisocyanate. The top coat made with such crosslinking agents exhibits superior adhesion and abrasion resistance, and superior non-yellowing properties upon exposure to U.V. radiation.

20 Claims, No Drawings

USE OF BIURET AND TRIMER ISOCYANATES AS CROSSLINKERS IN GOLF BALL COATINGS

TECHNICAL FIELD

The present invention relates to golf balls having a clear finish or top coating and, in particular, to an improved polyurethane top coating composition for the golf ball.

BACKGROUND OF THE INVENTION

For decades, golf balls were finished by applying one or more coats of paint or the like to the outer surface of the golf ball cover. To achieve a desirable white appearance, a multicoat paint system typically comprising a primer coat followed by one or more opaque coatings was applied to the golf ball. Such golf balls are typically referred to as "painted balls". In the 1980's, there was introduced the concept of incorporating pigment into the cover material prior to molding the cover of the golf ball, thereby eliminating the step of painting the golf ball. Such golf balls are typically referred to as "pigmented balls". Whether the golf balls are painted or pigmented, identifying indicia such as the manufacturer's trademark or logo, or a model or identification number are stamped on the ball. In order to prevent the stamped indicia from being rubbed off, and also to impart a desirable glossiness to the ball, one or two clear finishes or top coatings are applied to the ball. Typically, such clear coatings consist of a clear epoxy primer, followed by a clear urethane top coat. The urethane top coat is usually a two-pack polyurethane, consisting of separate packages of the polyol and the diisocyanate, which are mixed together and reacted to form the urethane coating. While the urethane top coatings of the prior art impart a desirable glossiness to the ball, they suffer from certain disadvantages. For example, the urethane coatings made from aromatic diisocyanates tend to yellow very quickly upon exposure to ultraviolet light, thus detracting from the appearance of the painted or pigmented ball. Also, the urethane coatings of the prior art typically suffer from adhesion and abrasion resistance problems. Good adhesion is required to protect the indicia stamped on the ball, while good abrasion resistance is needed to maintain glossiness of the ball.

OBJECTS OF THE INVENTION

Accordingly, it is an object of the invention to provide a golf ball having a urethane top coating that demonstrates superior adhesion and abrasion resistance compared to prior art urethane top coatings.

Another object of the present invention is to provide a golf ball having a urethane top coating that demonstrates superior color retention (non-yellowing) properties compared to prior art urethane top coatings.

A further object of the present invention is to provide a golf ball having a urethane top coating having a high crosslink density.

Another object of the present invention is to provide a golf ball having a urethane top coating made from a polyurethane system having a high percentage of solids content.

These and other objects and advantages will become apparent upon consideration of the present specification.

SUMMARY OF THE INVENTION

The invention is an improved urethane top coat for a golf ball. The improvement comprises the use of biurets and isocyanurate trimers of hexamethylene diisocyanate as the crosslinking agents in the urethane top coating for the golf balls. Coatings made with such crosslinking agents exhibit superior adhesion and abrasion resistance, and superior color retention upon exposure to U.V. radiation. Since the coatings are U.V. stable per se, lower amounts of U.V. stabilizer can be incorporated in the coatings, thus allowing the coatings to be manufactured at a lower cost. The coating system used in the present invention has a high solids content ranging from a (non-critical) minimum of about 40% to a maximum of 100%, alternatively a maximum of 90%, alternatively a maximum of 55%, but a relatively low viscosity. The lower viscosity facilitates spray coating at a higher solids content, resulting in increased transfer efficiency and decreased volatile organic carbon air emission during spray coating.

DESCRIPTION OF THE PREFERRED EMBODIMENT

The polyurethane top coat of the present invention is a two-part solvent borne polyurethane system. The first part comprises a hydroxyl functional polyol having an hydroxyl equivalent weight in the range of 50 to 1500, with the preferred equivalent weight being 200 to 500. Compounds containing the hydroxyl functional polyol contemplated herein include polyesters, polyethers, or acrylics. Preferably, the hydroxyl functional polyol is ethylenically saturated. Suitable saturated polyesters for use herein include poly (oxydiethylene adipates) that are condensation products of diethylene glycol and adipic acid, branched with trimethylolpropane or pentaerythritol, and polycaprolactone (hydroxycaproic acid) polyesters. Suitable saturated polyethers include polymers of propylene oxide or propylene oxide/ethylene oxide. Such materials are usually triols or diols with molecular weights between 1000 and 7000. Suitable saturated acrylics include derivatives of acrylic acid, such as methyl methacrylate, co-polymerized with hydroxyl functional monomers, such as 2-hydroxy-ethyl methacrylate. Polyols marketed by Miles Corporation, Pittsburgh, Pa. under the trademark DESMOPHEN are particularly contemplated for use herein. One such resin is Desmophen 651-A-65.

In addition to these polyhydroxyl compounds, other materials containing a reactive hydrogen atom that would react with the isocyanate or isocyanurate group to form the polyurethane can be utilized. Such materials include polyamines, polyamides, short oil alkyds, castor oil, epoxy resins with secondary hydroxyl groups, phenolic resins, and hydroxyl functional vinyl resins. Suitable examples of such materials include Ancamine 2071, a modified polyamine marketed by Pacific Anchor Chemical Corporation, Los Angeles, Calif., EPON V-40, a polyamide marketed by Shell Chemical Company, Houston, Tex., Aroplaz 1133-X-69, a short oil alkyd marketed by Spencer Kellogs Products Div., Reichhold Chemicals Inc., Minneapolis, Minn., EPON resin 828, an epoxy resin marketed by Shell Chemical Company, Pentalyn 802A, a phenolic modified polyester resin Marketed by Hercules Inc., Wilmington, Del., and VMCA, a hydroxyl functional vinyl resin marketed by Union Carbide, Danbury, Conn.

The hydroxyl functional polyol is carried in a solvent, with the solvent solution containing from about 15 to 35% by weight of the polyol solids. Suitable solvents for use herein include the known polyurethane solvents, for example, butyl acetate, methyl isobutyl ketone, methyl amyl ketone, propylene glycol monomethyl ether acetate, and mixtures thereof. Especially preferred as the solvent or co-solvent is methyl amyl ketone because its high dipole constant permits a greater amount of polyol or other resin solids to be dispersed therein. The advantages of the use of methyl amyl ketone in top coat coating systems, as well as examples illustrating such use, are described in U.S. application Ser. No. 08/093,094, now U.S. Pat. No. 5,409,233, by Thomas Kennedy, filed on even date herewith, the disclosure of which is hereby incorporated by reference.

Other additives can be included in the first part of the polyurethane system. These additives include U.V. stabilizers and absorbers, leveling agents, optical brighteners, mar and slip agents, catalysts, antioxidants, and defoaming agents.

U.V. stabilizers function to tie up free radicals in the top coating that are produced upon exposure to ultraviolet radiation, thus maintaining the integrity of the coating. A suitable U.V. stabilizer is Tinuvin 292, a hindered amine light stabilizer sold by Ciba-Geigy Corporation, Ardsley, N.Y. U.V. absorbers function to absorb ultraviolet radiation and re-emit it as heat. Examples of suitable U.V. stabilizers for use in the present invention are Tinuvin 1130, a benzotriazole U.V. absorber sold by Ciba-Geigy Corporation, and Sanduvor 3206, an oxalamide derivative sold by Sandoz Chemicals Corporation, Charlotte, N.C.

Suitable leveling agents which reduce the surface tension of the coating for improved coating flow include Fluorad FC-430, a fluorochemical surfactant sold by 3M Industrial Chemical Products Division, St. Paul, Minn., and DOW 57, a silicone additive sold by Dow Corning Corporation, Midland, Mich.

Optical brighteners are added to the polyurethane system so that the coating coverage can be checked under U.V. light. Suitable optical brighteners include Uvitex OB, believed to be 2,2'-( 2,5-thiophenediyl) bis (5-ter-butylbenzoxazole), sold by Ciba-Geigy Corporation, Ardsley, N.Y., and Lucopure EGM, a coumarin optical brightener sold by Sandoz Chemicals Corporation, Charlotte, N.C.

In addition to the additives, co-reactants can be incorporated into the polyol portion of the coating system. Such co-reactants can be either compositions that further polymerize with heat, or compositions that form a film after the solvent is evaporated during the polyurethane polymerization process. Such materials do not react with the isocyanate or isocyanurate portion of the coating system, but instead act independently to improve the final coating properties. A suitable polymerizing material for use herein is Cymel 303, a melamine resin sold by American Cyanamid. An example of a suitable film-forming resin is A-101, an acrylic, non-hydroxyl containing resin sold by Rohm & Haas, Philadelphia, Pa.

The additives and co-reactants are added in amounts from about 0–20% by weight of the total coating system. Preferably they are added in amounts from about 1–5% by weight of the total coating system.

The second part of the polyurethane system comprises the isocyanate or isocyanate crosslinking agent carried in a solvent. Although various diisocyanates, such as hexamethylene diisocyanate (HDI), methylene diisocyanate (MDI), toluene diisocyanate (TDI), and isophorone diisocyanate (IPDI) have been used as the polyurethane crosslinking agent in the prior art, it has now been found that the desirable properties of superior color retention, adhesion, and abrasion resistance in the polyurethane top coating are achieved only when the crosslinking agent is a biuret or trimer of HDI. The biuret of HDI has the following idealized formula:

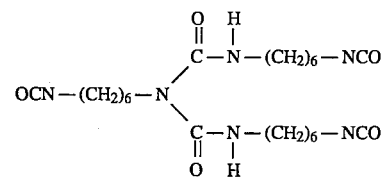

The isocyanurate trimer of HDI has the following idealized formula:

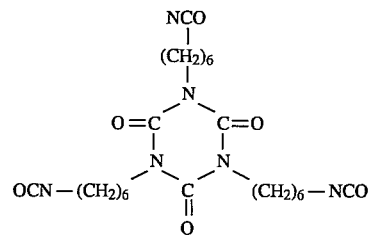

One advantage of the biurets and trimers used herein is that they result in a urethane coating that is U.V. stable per se. Thus, it is contemplated that the coatings of the present invention can be manufactured with lower amounts of U.V. stabilizers incorporated therein, resulting in lower costs of production for the coatings.

The biurets and isocyanurate trimers of HDI utilized in the present invention should have a viscosity within the range of about 3 to 10,000 cps, with the preferred range being from about 50 to 5,000 cps. Low viscosity biuret and trimer crosslinking agents are preferred because they allow the total coating system to have a higher solids content and still have a viscosity that facilitates spray painting/air atomization of the coating system on the outer surface of the golf ball. Biurets and trimers of HDI contemplated for use herein are sold by Miles under the trademark DESMODUR. One such composition is DESMODUR N-3200, a low viscosity biuret of HDI.

The isocyanate or isocyanurate equivalent weight of the biuret or trimer crosslinking agent used herein should be within the range of 100 to 1,200, with 150 to 300 being preferred. The biuret or trimer is carried in a solvent, with the solvent solution containing from a minimum of about 40% (or less, if a quite dilute solution is preferred for some reason), alternatively about 60%, alternatively about 70%, to a maximum of 100%, alternatively about 85%, by weight of the biuret or trimer. Suitable solvents for the crosslinking agent include methyl isobutyl ketone, methyl amyl ketone, butyl acetate and propylene glycol monomethyl ether acetate. Preferably, the solvent is methyl isobutyl ketone in order to alleviate any potential moisture problems encountered with the acetate solvents.

The use of methyl amyl ketone as the solvent for the polyol component, together with a low viscosity biuret or trimer of HDI as the isocyanate component enables a substantially higher solids content to be in the coating system than has heretofore been present in prior art golf ball coating systems. Prior art top coat coating systems typically have a solids content of 35%. The coating system of the present invention, however, has a solids content of from 40 to 55%. The higher solids content results in increased transfer efficiency and decreased volatile organic carbon air emission during the spray coating operation. The increased efficiency allows a reduction of about 25% in the amount of the coating material applied to the ball while still achieving the same coverage as prior art balls.

The first part of the polyurethane coating system containing the polyol and other additives is mixed with the second part of the coating system containing the biuret or trimer at an index or ratio of N=C=O to OH in the range of 0.90 to 1.5, with an index range of 0.95 to 1.2 being preferred. An index of 1.05 is most preferred since it takes into account any water that may be present in the polyol, and water vapor present in the air. The excess isocyanate insures that all of the polyol will be polymerized, with any excess isocyanate being converted to a polyurea. If any excess polyol is present, it will not polymerize and tends to act as a plasticizer, thus resulting in a coating of decreased hardness. When the two parts of the coating system are combined, the total system has the following general formulation:

| Polyol and isocyanate or isocyanurate | 35–100% |
|---|---|
| Solvent | 0–65% |
| Additives and/or co-reactants | 0–20% |

The coating system is applied to the outer surface of the golf ball using any conventional method. The outer surface may be either the cover of the golf ball or, more typically, a primer coat that has been applied to the cover of the golf ball. The cover of the golf ball is usually made of an ionomer resin such as SURLYN (a trademark of E.I. DuPont De Nemours & Co., Wilmington, Del.) or IOTEK (a trademark of Exxon Chemical Co., Polymers Group, Baytown, Tex.). The cover may, however, be made of balata (a natural resin) or a thermoplastic polyurethane. For golf balls having a cover made of an ionomer having a relatively high zinc content, a cover made of thermoplastic polyurethane, or a cover made of mixtures of ionomers and polyurethanes, a primer coat may not be necessary. Thus, the top coat can be applied directly to the cover of the ball with good adhesion. Also, the urethane coatings herein having a relatively high index exhibit very good adhesion to the golf ball cover without the need for a primer coat.

For a typical golf ball, however, a primer coat is applied to the cover to promote the adhesion of the top coat to the golf ball. The primers useful herein may be formulated as follows:

The primer composition consists essentially of from about 90% by weight to about 96% by weight, preferably about 90% by weight, of a water-borne dispersion of a resin selected from the group consisting of acrylic resin, polyurethane resin, and combinations thereof, and from about 4% to about 10% by weight, preferably about 5% by weight, of a polyfunctional aziridine crosslinker material. (As used here, "dispersion" includes colloidal emulsions, latices, and other dispersed forms of the composition.)

The waterborne resin dispersion used in the primer may be an acrylic emulsion or lacquer, for example a material sold by Zeneca Resins Division of Imperial Chemical Industries, PLC, of Wilmington, Del. under the trademark NeoCryl. Particular materials of this type include NeoCryl A-601 and NeoCryl B-723, among others.

The waterborne resin dispersion used in the primer may instead be a polyurethane prepolymer emulsion, for example a material sold by Zeneca, under the trademark NeoRez. A specific NeoRez dispersion useful herein is NeoRez R-960 emulsion. Another material which may be used is WITCOBOND W-234, supplied by Witco, Organics Division, Chicago, Ill.

Combinations of acrylic and polyurethane dispersions are also contemplated within the scope of the present invention. The water-borne dispersions contemplated herein contain from about 5% to about 90% solids, preferably from about 20% to about 40% solids.

One of ordinary skill in the art is readily able to select a resin dispersion which is useful in a primer for the ball cover materials specified above.

The polyfunctional aziridine crosslinker materials useful herein are preferably tri- or more highly functional compounds. The preferred materials include: pentaerythritol-tris-(β-(N-aziridinyl) propionate); trimethylol-propane-tris-(β -(N-aziridinyl)propionate); mixtures of different polyfunctional aziridines identified in U.S. Pat. No. 5,057,371 (for example, from column 3, line 45 to column 5 line 19); the polyaziridine materials identified in U.S. Pat. Nos. 5,091,239 and 4,842,950; and other polyfunctional aziridines. The patents listed in this paragraph are hereby incorporated herein by reference in their entireties to exemplify polyfunctional aziridines. Representative polyfunctional aziridines which are useful herein are sold under the trade designations CX-100; XAMA-2; and XAMA-7 by the manufacturers listed in the patents previously incorporated by reference.

Other additives such flatting agents, surfactants, flow agents, thickeners and defoamers known to those skilled in the art can be incorporated into the primer composition.

Whether the top coat is applied directly to the cover or to a primer coat, it is preferred that the coating system be applied by spraying the coating onto the ball. One method of spraying the coating is as follows:

The polyol and HDI biuret or trimer portions are pre-mixed in a pressure pot. Dry air is used to push the coating to an air atomizing spray gun where it is forced out of a small diameter (0.1 inches) fluid nozzle. The material is then atomized at the tip of the gun by the air cap, again using dry air. This forms a fan of fine droplets that impinge upon the surface of the golf ball. The golf balls are then placed in a 130° F. oven for six hours where the solvent evaporates and the polyol and the HDI biuret or trimer polymerize to form the polyurethane top coat.

The polyurethane top coat of the present invention advantageously has a high crosslink density, resulting in a coating that exhibits good hardness and toughness. The hardness is typically measured using a Sward Rocker hardness tester or a pencil hardness tester. The Sward Rocker test is performed according to ASTM D2134 and the pencil hardness testing is accomplished using ASTM D3363. The top coatings of the present invention have a Sward Rocker hardness in the range of from 40 to 70, while the pencil hardness of the coatings is in the range of 5H to 6H.

The invention is further illustrated, but is not intended to be limited by the following examples, in which all parts and percentages are by weight unless otherwise specified.

EXAMPLE 1

A composition in accordance with the present invention is made using the ingredients in Table 1. Portion "A" is mixed with portion "B" in a one-to-one ratio, and the mixed components are then applied to the surface of a dozen golf balls using the method of spray coating described above. The golf balls are baked in an oven set at 130° F. for six hours. The resulting golf balls have a tough crosslinked polyurethane coating having a smooth, glossy appearance.

TABLE 1

| MATERIAL | AMOUNT (pbw) | SOLIDS (%) |
|---|---|---|
| PART A | | |
| Polyester resin (Desmophen 651A-65, Miles Corporation, Pittsburgh, Pa.) | 100 | 19.380 |
| Polyester resin (Desmophen 670-80, Miles Corporation) | 30 | 7.156 |
| Butyl Acetate | 35 | 0.000 |
| Methyl isobutyl ketone | 10 | 0.000 |
| Methyl amyl ketone | 50 | 0.000 |
| Leveling additive (3M FC-430) | 0.3 | 0.089 |
| U.V. stabilizer (Tinuvin 292) | 1.0 | 0.596 |
| U.V. absorber (Sanduvor 3206) | 2.0 | 0.298 |
| Optical brightener (Uvitex OB) | 0.1 | 0.030 |
| PART B | | |
| HDI biuret (Desmophen N-3200, Miles Corporation | 67 | 19.976 |
| Methyl isobutyl ketone | 40 | 0.000 |
| TOTAL (PARTS A AND B) | 335.40 | 47.525% |

The golf balls made in accordance with Example 1 are tested for color retention by exposing the balls to the sun in South Florida for periods of 8, 16, 32, 64, 96 and 128 days. The balls are also tested for abrasion resistance and adhesion of the top coat using the following testing procedure, which is an in-house test performed at Spalding:

A dozen finished and cured golf balls that have been out of the oven for at least 48 hours are soaked in tap water for 3 hours. The balls are then shot at 125 feet/sec. against a steel wall that is at a 45 degree angle to the vector of the golf ball. The steel wall also has vertical corrugations on it to simulate the face of a golf club. The ball is allowed to bounce around in a barrel (hexagonal shaped) and, after reaching the bottom, is returned to the beginning of the cycle. The test is repeated 100 times. At the end of the test, the golf balls are dyed using a Pylam dye. This dye stains the coating brown but leaves the ionomer cover white, thus showing areas where the coating has worn off.

Competitive golf balls, as well as an in-house prior art control golf ball are similarly tested in South Florida and in the barrel test for comparison to the Example 1 balls. The Example 1 balls are superior to the competitive golf balls and the control for color retention, abrasion resistance and adhesion.

EXAMPLE 2 (Comparative)

A coating composition having the following ingredients is made and applied to the surface of a dozen golf balls using the spray coating method described above.

| MATERIAL | AMOUNT (pbw) |
|---|---|
| Polyacrylic resin | 100.0 |
| Vinyl resin | 20.0 |

-continued

| MATERIAL | AMOUNT (pbw) |
|---|---|
| (for adhesion promotion) | |
| Propylene glycol monomethyl ether acetate | 20.0 |
| Methyl amyl ketone | 55.0 |
| U.V. stabilizer | 1.0 |
| U.V. absorber | 2.0 |
| Optical brightener | 0.1 |
| Leveling additive | 0.3 |
| Toluene diisocyanate | 32.1 |

The resulting golf balls are compared to the Example 1 golf balls. The golf balls of Example 2 have inferior abrasion resistance compared to the Example 1 golf balls and exhibit yellowing upon exposure to U.V. radiation.

Many modifications and variations of the present invention are possible in light of the above teachings. Thus, it is to be understood that, within the scope of the appended claims, the invention may be practiced otherwise than as described hereinafter.

What is claimed and desired to be secured by Letters Patent is:

1. In a golf ball having a clear polyurethane top coat made by combining a polyol portion and a diisocyanate portion, the improvement comprising said diisocyanate being selected from the group consisting of a biuret of hexamethylene diisocyanate and an isocyanurate trimer of hexamethylene diisocyanate.

2. The improvement of claim 1, wherein the diisocyanate has a viscosity in the range of 3 to 10,000 cps.

3. The improvement of claim 2, wherein the diisocyanate has a viscosity in the range of 50 to 5,000 cps.

4. The improvement of claim 1, wherein the diisocyanate portion consists essentially of the biuret or trimer of hexamethylene diisocyanate and a solvent.

5. The improvement of claim 4, wherein the diisocyanate portion contains from 15–30% by weight of the biuret or trimer of hexamethylene diisocyanate.

6. The improvement of claim 1, wherein the diisocyanate has an equivalent weight of 100 to 1,200.

7. The improvement of claim 1, wherein the top coat has a Sward Rocker hardness in the range of 40 to 70.

8. The improvement of claim 1, wherein the top coat has a pencil hardness of 5H to 6H.

9. A golf ball comprising:
   a cover; and
   a clear polyurethane top coat, the top coat being formed from a two-part urethane system having a first part comprising a polyol and a second part consisting essentially of a solvent and a diisocyanate selected from the group consisting of a biuret and an isocyanurate trimer of hexamethylene diisocyanate.

10. The golf ball of claim 9, wherein the polyol has an equivalent weight of 50 to 1,500.

11. The golf ball of claim 10, wherein the polyol has an equivalent weight of 200 to 500.

12. The golf ball of claim 9, wherein the urethane system has an index in the range of 0.90 to 1.5.

13. The golf ball of claim 12, wherein the urethane system has an index range of 0.95 to 1.2.

14. The golf ball of claim 9, wherein the polyol is selected from the group consisting of polyesters, polyethers, acrylics, polyamines, polyamides, short oil alkyds, castor oil, epoxy resins having secondary hydroxyl groups, phenolic resins, hydroxyl functional vinyl resins, and mixtures thereof.

15. The golf ball of claim 9, wherein the polyol is an ethylenically saturated polyol.

16. The golf ball of claim 9, wherein the urethane system has a solids content of 40 to 55% by weight.

17. The golf ball of claim 9, wherein a primer coat is interposed between the cover and the top coat.

18. The golf ball of claim 9, wherein the second part contains from 70% to 85% by weight of the biuret or trimer of hexamethylene diisocyanate.

19. The golf ball of claim 9, wherein the diisocyanate has a viscosity in the range of 3 to 10,000 cps.

20. The golf ball of claim 19, wherein the diisocyanate has a viscosity in the range of 50 to 5,000 cps.

* * * * *